(12) United States Patent
Sladen

(10) Patent No.: US 6,799,793 B1
(45) Date of Patent: Oct. 5, 2004

(54) TRAILER WIND BYPASS SYSTEM

(76) Inventor: Gordon Sladen, 6278 Juan Diaz Ave., Riverside, CA (US) 92509

( * ) Notice: Subject to any disclaimer, the term of this patent is extended or adjusted under 35 U.S.C. 154(b) by 0 days.

(21) Appl. No.: 10/700,954

(22) Filed: Oct. 31, 2003

(51) Int. Cl.[7] .................................................. B60J 5/06
(52) U.S. Cl. .................................. 296/186.4; 296/180.4
(58) Field of Search .......................... 296/180.4, 186.4, 296/155, 208; 180/903

(56) References Cited

U.S. PATENT DOCUMENTS

| | | | | |
|---|---|---|---|---|
| 1,150,282 | A | * | 8/1915 | Martin ..................... 296/186.4 |
| 4,840,422 | A | * | 6/1989 | Engel ....................... 296/180.4 |
| 4,854,631 | A | * | 8/1989 | Laursen ....................... 296/158 |
| 5,595,419 | A | | 1/1997 | Spears |
| 5,772,271 | A | * | 6/1998 | Sanders ......................... 296/32 |
| 5,791,724 | A | | 8/1998 | Wasley |
| 6,224,141 | B1 | | 5/2001 | Brodlo |
| 6,425,347 | B1 | * | 7/2002 | Bogner et al. .............. 119/318 |

\* cited by examiner

Primary Examiner—Lori L. Coletta

(57) ABSTRACT

A trailer wind bypass system for inhibiting a trailer be tipped over by the wind. The trailer wind bypass system includes a trailer member comprising a box portion and a plurality of wheels. The box portion is designed for receiving items to be transported over the road. The wheels are rotatably coupled to the box portion to facilitate transportation of the box portion over the road. The trailer member is designed for being coupled to a tractor for pulling the trailer member over the road. The box portion of the trailer member comprises a plurality of vent assemblies to permit wind to pass through the box portion of the trailer member. At least one actuation assembly is operationally coupled to the vent assemblies. The actuation assembly is for selectively opening and closing the vent assemblies when the actuation assembly is actuated by a user.

9 Claims, 3 Drawing Sheets

TRAILER WIND BYPASS SYSTEM

BACKGROUND OF THE INVENTION

1. Field of the Invention

The present invention relates to air deflector assemblies and more particularly pertains to a new trailer wind bypass system for inhibiting a trailer be tipped over by the wind.

2. Description of the Prior Art

The use of air deflector assemblies is known in the prior art. U.S. Pat. No. 5,595,419 describes a system for deflecting air around trailer. Another type of air deflector assembly is U.S. Pat. No. 5,791,724 having a plurality of fins attached to the top of tractor for deflecting air passing over the cab of the tractor sideways and downwardly through a gap behind the cab. U.S. Pat. No. 6,224,141 has a deflecting system mounted to the side of a trailer for deflecting air over and under the trailer.

While these devices fulfill their respective, particular objectives and requirements, the need remains for a system that has certain improved features that allow for wind to pass through the trailer to reduce the chances of the trailer being tipped over by the wind.

SUMMARY OF THE INVENTION

The present invention meets the needs presented above by vent assemblies coupled to the box portion of a trailer member that selectively open to allow wind striking the side of the box portion to pass directly through the box portion.

Still yet another object of the present invention is to provide a new trailer wind bypass system that is easily activated by the user driving the tractor.

To this end, the present invention generally comprises a trailer member comprising a box portion and a plurality of wheels. The box portion is designed for receiving items to be transported over the road. The wheels are rotatably coupled to the box portion whereby the wheels are designed for rolling across the road to facilitate transportation of the box portion over the road. The trailer member is designed for being coupled to a tractor whereby the tractor pulls the trailer member over the road. The box portion of the trailer member comprises a plurality of vent assemblies. Each of the vent assemblies is selectively opened to permit wind to pass through the box portion of the trailer member. At least one actuation assembly is operationally coupled to the vent assemblies. The actuation assembly is coupled to the trailer member. The actuation assembly is for selectively opening and closing the vent assemblies when the actuation assembly is actuated by a user.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
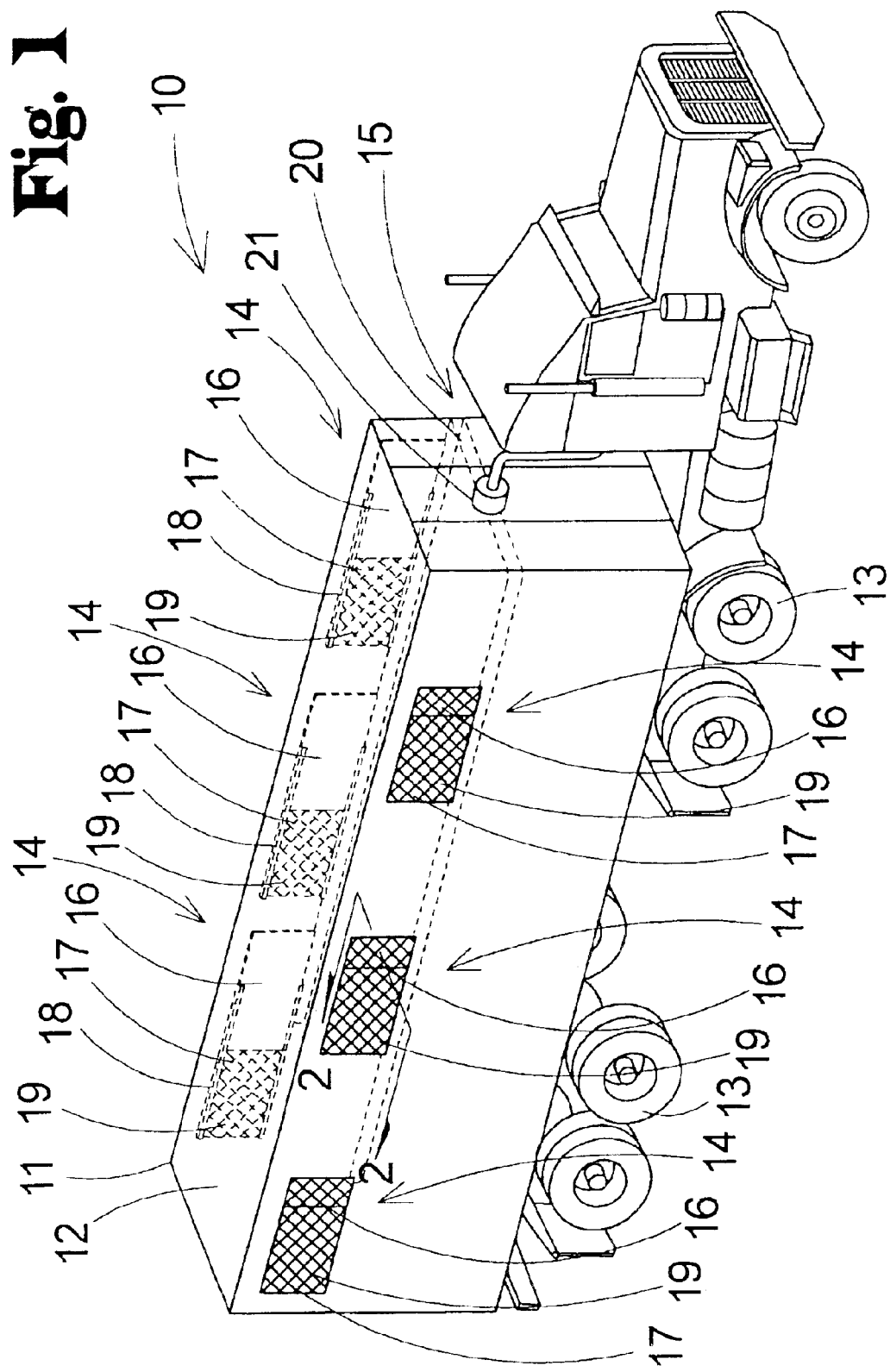
FIG. 1 is a perspective view of a new trailer wind bypass system according to the present invention shown coupled to a tractor.
Figure 2:
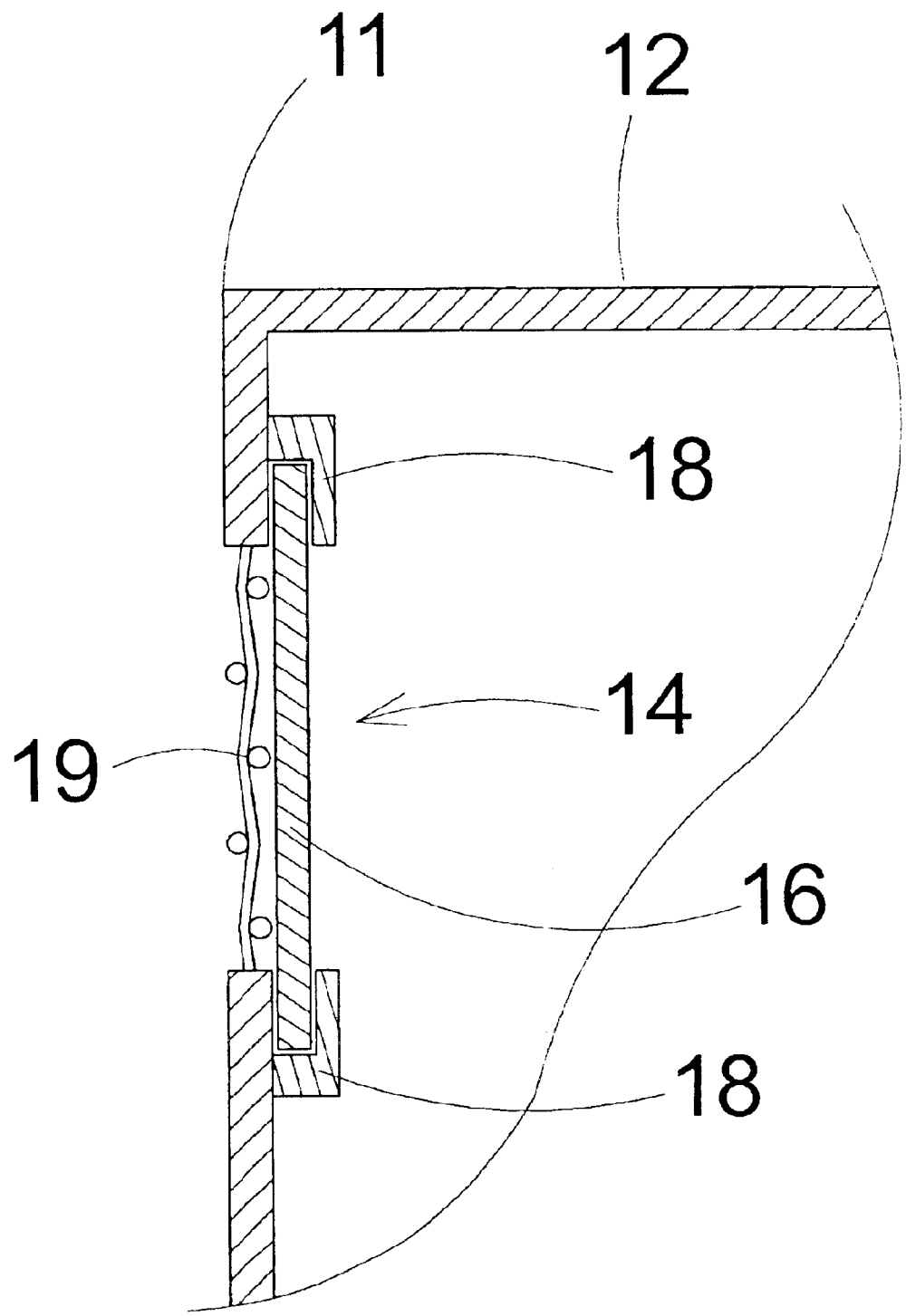
FIG. 2 is a cross-sectional view of one of the vent assemblies the present invention taken along line 2—2 of FIG. 1.
Figure 3:
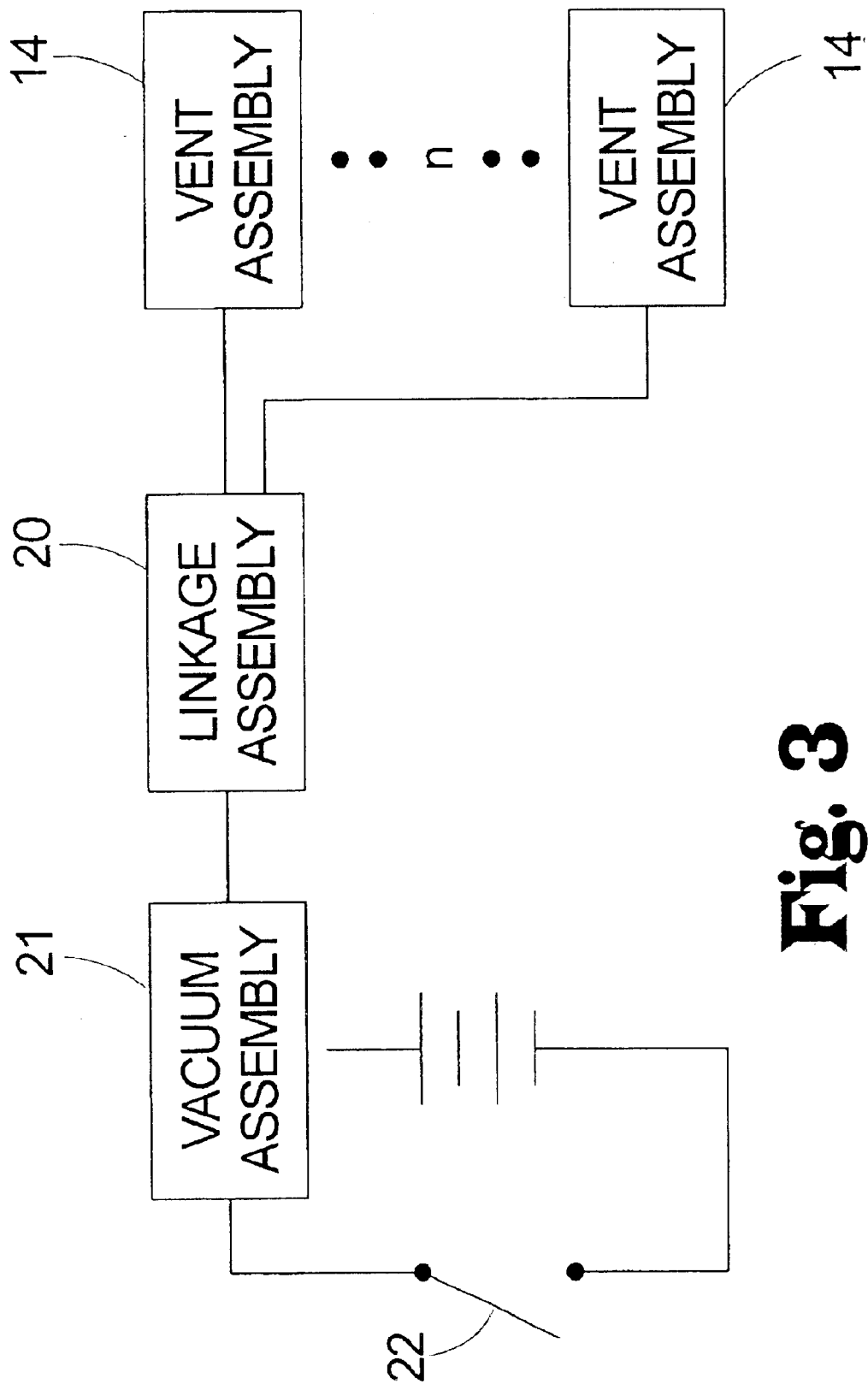
FIG. 3 is a schematic view of the present invention.

With reference now to the drawings, and in particular to FIGS. 1 through 3 thereof, a new trailer wind bypass system embodying the principles and concepts of the present invention and generally designated by the reference numeral 10 will be described.

As best illustrated in FIGS. 1 through 3, the trailer wind bypass system 10 generally comprises a trailer member 11 comprising a box portion 12 and a plurality of wheels 13. The box portion 12 is designed for receiving items to be transported over the road. The wheels 13 are rotatably coupled to the box portion 12 whereby the wheels 13 are designed for rolling across the road to facilitate transportation of the box portion 12 over the road. The trailer member 11 is designed for being coupled to a tractor whereby the tractor pulls the trailer member 11 over the road.

The box portion 12 of the trailer member 11 comprises a plurality of vent assemblies 14. Each of the vent assemblies 14 is selectively opened to permit wind to pass through the box portion 12 of the trailer member 11. Each of the vent assemblies 14 is positioned opposite one of the other of the vent assemblies 14. Each of the vent assemblies 14 is designed for permitting wind to pass directly through the box portion 12 to the aligned one of the vent assemblies 14 to be vented out of the other side-of the box portion 12 to reduce the amount of force produced on the box portion 12 by the wind.

At least one actuation assembly 15 is operationally coupled to the vent assemblies 14. The actuation assembly 15 is coupled to the trailer member 11. The actuation assembly 15 is for selectively opening and closing the vent assemblies 14 when the actuation assembly 15 is actuated by a user.

Each of the vent assemblies 14 comprises a door member 16. The door member 16 of each of the vent assemblies 14 is positioned adjacent one of a plurality of vent apertures 17 in the box portion 12 of the trailer member 11. The door member 16 is operationally coupled to the box portion 12 whereby the door member 16 is selectively slid over the associated one of the vent apertures 17 to open and close the vent apertures 17. The door member 16 of each of the vent assemblies 14 is operationally coupled to the actuation assembly 15 whereby the actuation assembly 15 actuates the door member 16 of each of the vent assemblies 14 to selectively open and close the vent apertures 17 of the trailer member 11 when the actuation assembly 15 is actuated by the user.

Each of the vent assemblies 14 comprises a pair of rail members 18. Each of the rail members 18 is coupled to the box portion 12 of the trailer member 11 whereby each of the rail members 18 is positioned adjacent the associated one of the vent apertures 17 of the trailer member 11. Each of the rail members 18 slidably receives the door member 16 of the associated one of the vent assemblies 14 whereby the rail members 18 permit the door member 16 to slide with respect the associated one of the vent apertures 17 when the door member 16 of each of the vent assemblies 14 is actuated by the user.

Each of the vent assemblies 14 comprises a screen member 19. The screen member 19 is coupled to the box portion 12 of the trailer member 11 whereby the screen member 19 is positioned over the associated one of the vent apertures 17 whereby the screen member 19 is designed for inhibiting items in the box portion 12 from falling through the associated one of the vent apertures 17. The screen member 19 is designed for permitting fluid to pass through the screen member 19 to reduce the force applied to the box portion 12 by wind blowing against the box portion 12 when the door member 16 are actuated by actuation assembly 15 to open the vent apertures 17.

A linkage assembly 20 is operationally coupled between the door member 16 of each of the vent assemblies 14 and the actuation assembly 15. The linkage assembly 20 is for permitting the actuation assembly 15 to actuate the door member 16 of each of the vent assemblies 14 simultaneously when the actuation assembly 15 is actuated by the user.

The actuation assembly 15 comprises a vacuum assembly 21. The vacuum assembly 21 is operationally coupled to the linkage assembly 20. The vacuum assembly 21 is coupled to the box portion 12 of the trailer assembly. The vacuum assembly 21 is for actuating the door member 16 of each of the vent assemblies 14 to selectively permit wind to pass through the box portion 12 of the trailer assembly.

The actuation assembly 15 comprises a switch member 22. The switch member 22 is operationally coupled to the vacuum assembly 21 whereby the switch member 22 is for actuating the vacuum assembly 21 when the switch member 22 is actuated by the user. The switch member 22 is designed for being positioned in the tractor whereby the switch member 22 is easily accessed by the user driving the tractor.

In use, the user actuates the switch member 22 to actuate the vacuum assembly 21 to slide the door member 16 of each of vent assemblies 14 and open the vent apertures 17 of the box portion 12 when the user feels the wind is applying a greater than desired force on the box portion 12. As the vent apertures 17 are opened the wind is allowed to pass through the box portion 12 to reduce the force the wind is applying to the trailer member 11 and thereby inhibit the trailer member 11 from being tipper over by the wind. The user then actuates the switch member 22 again to actuates the vacuum assembly 21 and allows the door member 16 of each of the vent assemblies 14 slide back and close the vent apertures 17 when the wind is no longer applying a greater than desired force on the trailer member 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A trailer wind bypass system for allowing wind to vent through a trailer to reduce the chance the trailer will be tipped over, the trailer wind bypass system comprising:
    a trailer member comprising a box portion and a plurality of wheels, said box portion being adapted for receiving items to be transported over the road, said wheels being rotatably coupled to said box portion such that said wheels are adapted for rolling across the road to facilitate transportation of the box portion over the road, said trailer member being adapted for being coupled to a tractor such that said tractor pulls said trailer member over the road;
    said box portion of said trailer member comprising a plurality of vent assemblies, each of said vent assemblies being selectively opened to permit wind to pass through said box portion of said trailer member; and
    at least one actuation assembly being operationally coupled to said vent assemblies, said actuation assembly being coupled to said trailer member, said actuation assembly being for selectively opening and closing said vent assemblies when said actuation assembly is actuated by a user.

2. The trailer wind bypass system as set forth in claim 1, further comprising:
    each of said vent assemblies comprising a door member, said door member of each of said vent assemblies being positioned adjacent one of a plurality of vent apertures in said box portion of said trailer member, said door member being operationally coupled to said box portion such that said door member is selectively slid over the associated one of said vent apertures to open and close said vent apertures, said door member of each of said vent assemblies being operationally coupled to said actuation assembly such that said actuation assembly actuates said door member of each of said vent assemblies to selectively open and close said vent apertures of said trailer member when said actuation assembly is actuated by the user.

3. The trailer wind bypass system as set forth in claim 2, further comprising:
    each of said vent assemblies comprising a pair of rail members, each of said rail members being coupled to said box portion of said trailer member such that each of said rail members is positioned adjacent the associated one of said vent apertures of said trailer member, each of said rail members slidably receiving said door member of the associated one of said vent assemblies such that said rail members permit said door member to slide with respect the associated one of said vent apertures when said door member of each of said vent assemblies is actuated by the user.

4. The trailer wind bypass system as set forth in claim 2, further comprising:
    each of said vent assemblies comprising a screen member, said screen member being coupled to said box portion of said trailer member such that said screen member is positioned over the associated one of said vent apertures such that said screen member is adapted for inhibiting items in said box portion from falling through the associated one of said vent apertures, said screen member being adapted for permitting fluid to pass through said screen member to reduce the force applied to said box portion by wind blowing against said box portion when said door member are actuated by actuation assembly to open said vent apertures.

5. The trailer wind bypass system as set forth in claim 2, further comprising:
    a linkage assembly being operationally coupled between said door member of each of said vent assemblies and said actuation assembly, said linkage assembly being for permitting said actuation assembly to actuate said door member of each of said vent assemblies simultaneously when said actuation assembly is actuated by the user.

6. The trailer wind bypass system as set forth in claim 1, further comprising:
    said actuation assembly comprising a vacuum assembly, said vacuum assembly being operationally coupled to said vent assemblies, said vacuum assembly being coupled to said box portion of said trailer assembly, said vacuum assembly being for actuating said vent assemblies to selectively permit wind to pass through said box portion of said trailer assembly.

7. The trailer wind bypass system as set forth in claim 6, further comprising:
    said actuation assembly comprising a switch member, said switch member being operationally coupled to said vacuum assembly such that said switch member is for actuating said vacuum assembly when said switch member is actuated by the user, said switch member being adapted for being positioned in the tractor such that said switch member is easily accessed by the user driving the tractor.

8. The trailer wind bypass system as set forth in claim 1, further comprising:
    each of said vent assemblies being positioned opposite one of the other of said vent assemblies, each of said vent assemblies being adapted for permitting wind to pass directly through said box portion to the aligned one of said vent assemblies to be vented out of the other side of said box portion to reduce the amount of force produced on the box portion by the wind.

9. A trailer wind bypass system for allowing wind to vent through a trailer to reduce the chance the trailer will be tipped over, the trailer wind bypass system comprising:
    a trailer member comprising a box portion and a plurality of wheels, said box portion being adapted for receiving items to be transported over the road, said wheels being rotatably coupled to said box portion such that said wheels are adapted for rolling across the road to facilitate transportation of the box portion over the road, said trailer member being adapted for being coupled to a tractor such that said tractor pulls said trailer member over the road;
    said box portion of said trailer member comprising a plurality of vent assemblies, each of said vent assemblies being selectively opened to permit wind to pass through said box portion of said trailer member;
    at least one actuation assembly being operationally coupled to said vent assemblies, said actuation assembly being coupled to said trailer member, said actuation assembly being for selectively opening and closing said vent assemblies when said actuation assembly is actuated by a user,
    each of said vent assemblies comprising a door member, said door member of each of said vent assemblies being positioned adjacent one of a plurality of vent apertures in said box portion of said trailer member, said door member being operationally coupled to said box portion such that said door member is selectively slid over the associated one of said vent apertures to open and close said vent apertures, said door member of each of said vent assemblies being operationally coupled to said actuation assembly such that said actuation assembly actuates said door member of each of said vent assemblies to selectively open and close said vent apertures of said trailer member when said actuation assembly is actuated by the user;
    each of said vent assemblies comprising a pair of rail members, each of said rail members being coupled to said box portion of said trailer member such that each of said rail members is positioned adjacent the associated one of said vent apertures of said trailer member, each of said rail members slidably receiving said door member of the associated one of said vent assemblies such that said rail members permit said door member to slide with respect the associated one of said vent apertures when said door member of each of said vent assemblies is actuated by the user;
    each of said vent assemblies comprising a screen member, said screen member being coupled to said box portion of said trailer member such that said screen member is positioned over the associated one of said vent apertures such that said screen member is adapted for inhibiting items in said box portion from falling through the associated one of said vent apertures, said screen member being adapted for permitting fluid to pass through said screen member to reduce the force applied to said box portion by wind blowing against said box portion when said door member are actuated by actuation assembly to open said vent apertures;
    a linkage assembly being operationally coupled between said door member of each of said vent assemblies and said actuation assembly, said linkage assembly being for permitting said actuation assembly to actuate said door member of each of said vent assemblies simultaneously when said actuation assembly is actuated by the user;
    said actuation assembly comprising a vacuum assembly, said vacuum assembly being operationally coupled to said linkage assembly, said vacuum assembly being coupled to said box portion of said trailer assembly, said vacuum assembly being for actuating said door member of each of said vent assemblies to selectively permit wind to pass through said box portion of said trailer assembly;
    said actuation assembly comprising a switch member, said switch member being operationally coupled to said vacuum assembly such that said switch member is for actuating said vacuum assembly when said switch member is actuated by the user, said switch member being adapted for being positioned in the tractor such that said switch member is easily accessed by the user driving the tractor; and
    each of said vent assemblies being positioned opposite one of the other of said vent assemblies, each of said vent assemblies being adapted for permitting wind to pass directly through said box portion to the aligned one of said vent assemblies to be vented out of the other side of said box portion to reduce the amount of force produced on the box portion by the wind.

* * * * *